(No Model.)
W. BOWKER.
CLEANSING SAWS.
No. 279,698.
Patented June 19, 1883.
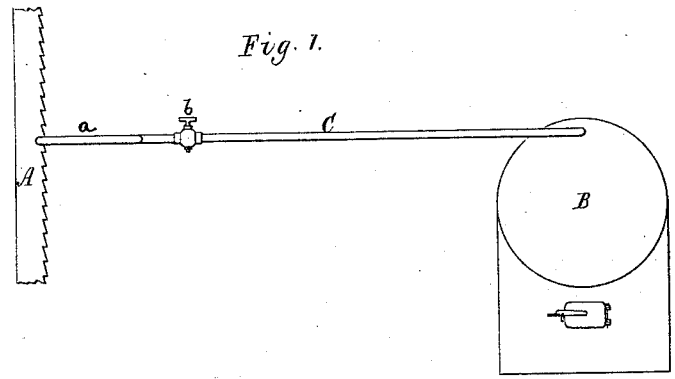
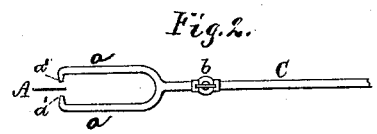
Witnesses
S. N. Piper
E. D. Pratt
Inventor
William Bowker.
by R. H. Eddy att'y.

UNITED STATES PATENT OFFICE.

WILLIAM BOWKER, OF SOMERVILLE, ASSIGNOR, BY MESNE ASSIGNMENTS, TO HIMSELF AND ROBERT WILLIAMS, OF BOSTON, MASSACHUSETTS.

CLEANSING SAWS.

SPECIFICATION forming part of Letters Patent No. 279,698, dated June 19, 1883.

Application filed December 22, 1882. (No model.)

*To all whom it may concern:*

Be it known that I, WILLIAM BOWKER, of Somerville, in the county of Middlesex and Commonwealth of Massachusetts, a subject of the Queen of Great Britain, have invented a new and useful improvement in cleansing a saw or keeping it free of gum or other adhesive woody matter while such saw may be at work in wood; and I do hereby declare the same to be described in the following specification and represented in the accompanying drawings, of which—

Figure 1 is a side view, and Fig. 2 a top view, of a saw provided with means for cleansing it or keeping it free of gum, &c.

In sawing hoop-poles with a band-saw the gum of the wood is liable to gather on the saw, and especially between its teeth, and thereby to seriously affect or obstruct it in its operation, for when the gummy matter so gets upon the saw the fine sawdust will become more or less embedded between the teeth of the saw, and be there held by the gum, so as to prevent the teeth from properly entering the wood. The gum also, when on the sides of the saw, causes friction of the saw in the wood, and thereby necessarily increases the power required to drive the saw. By reason of such adhesion or gathering of gummy matter on saws, while at work, it heretofore has been necessary to cleanse them of it occasionally, if not often, with suitable tools or means, such causing an expenditure of considerable time and labor, all of which by my invention is avoided.

In carrying out my said invention I apply to the saw means of generating steam, and while the saw may be in operation discharging such steam in a jet or jets upon the part or parts of it liable to gather the gum or sticky matter from the wood. The hot steam so thrown upon the saw heats or warms it, and prevents it from being clogged by the gum, and, besides, causes it to operate to better advantage in the wood, and generally to run with less resistance, and with the consumption of less power than it will without the application of steam to it.

The means of generating steam and discharging it upon the saw are represented in the drawings, in which A denotes a saw; B, a steam boiler or generator, and C a conduit leading therefrom, furcated so as to form two jet-pipes, $a\ a$, and having a stop-cock, $b$. The jet-pipes $a\ a$ come upon opposite sides of the saw A, and their ends $a'\ a'$ are turned in so as to be at about a right angle to the axis of the saw and in the line of its teeth, as shown.

In some cases it may be useful to place the jet-pipes so as to discharge steam not only upon the saw, but more or less of it into the kerf made in the wood by the saw, so as to soften the wood at the point or place of its disintegration or destruction by the teeth of the saw, and thereby render it easier for the saw to cut into the wood; but with the steam applied to the saw alone excellent results follow, the saw being kept clean or free from the gum or adhesive matter of the wood.

I am aware that it is not new to force cool water against a saw while in operation, such being for the purpose of cooling the saw or preventing it from heating, so as to char or burn the wood or article in process of being sawed by it, and therefore I make no claim thereto. I use steam instead of cool water, my purpose being to heat the saw and the gummy matter therein derived from the wood, in order not only to melt or liquefy such gummy matter, but to force it off the saw; and when I use the steam, in manner described, on the saw, I accomplish results unattainable by the use of cool water if substituted for the steam. I bring into action a new element—viz., heat, and also water in a state of vapor, and under a degree of tension that while it accomplishes what cool water will not do, it also prevents the saw from heating, so as to burn or char the wood. Consequently

What I claim is—

The method of cleansing a saw while in operation, which consists in discharging steam upon the teeth of the same, as set forth.

WILLIAM BOWKER.

Witnesses:
R. H. EDDY,
E. B. PRATT.